G. L. WHITE.
BEE FEEDER.
APPLICATION FILED AUG. 19, 1911.
1,022,762.
Patented Apr. 9, 1912.
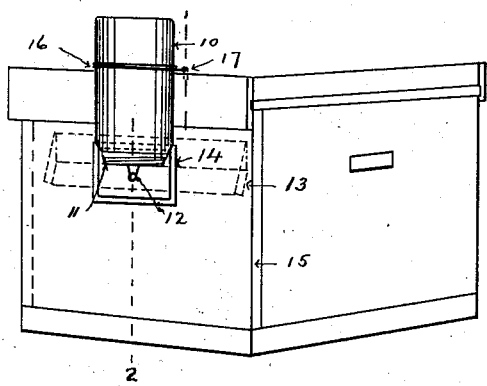
Fig. 1
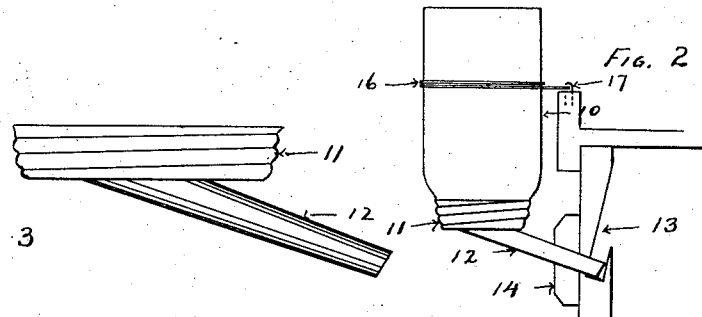
Fig. 2
Fig. 3
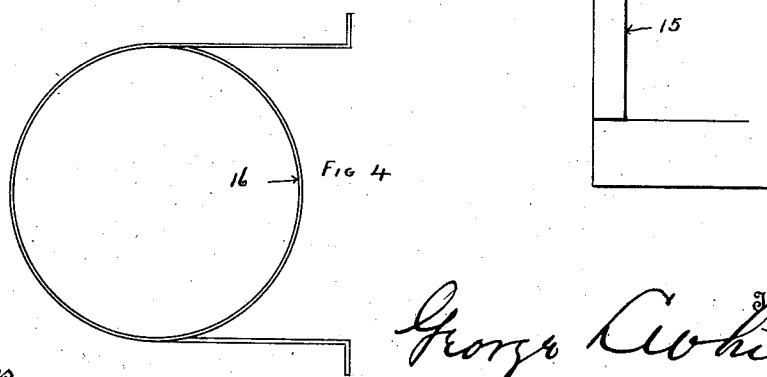
Fig. 4
Witnesses
George L. White, Inventor

UNITED STATES PATENT OFFICE.

GEORGE L. WHITE, OF NEWARK, NEW JERSEY.

BEE-FEEDER.

1,022,762.  Specification of Letters Patent.  Patented Apr. 9, 1912.

Application filed August 19, 1911. Serial No. 645,019.

*To all whom it may concern:*

Be it known that I, GEORGE L. WHITE, a citizen of the United States, residing at Newark, in the county of Essex and State of New Jersey, have invented a new and useful Bee-Feeder, of which the following is a specification.

My invention relates to improvement in method of feeding bees either in spring feeding for stimulating brood rearing or fall feeding to prevent starvation.

The principal object of my improvement is to place a regular and continuous flow of liquid feed in close proximity to and on the same level of the cluster in the hive thereby obviating the necessity of the bees descending in a colder atmosphere and becoming chilled. The feed is directly back of the cluster and far removed from entrance thereby entirely preventing robbing. I attain these objects by means of jar, can or other vessel, screw top with spout attached, and mortise cut in side or end of hive and spiral spring to securely fasten vessel, jar or can to the hive.

Figure 1 is a perspective of a bee hive with vessel, jar or can, screw-top with spout attached, reinforced block, spiral spring and mortise cut in end of hive. Fig. 2 is a vertical section of part of hive on the line 1—2. Fig. 3 is view of screw-top with spout attached. Fig. 4 is spiral spring.

Similar numerals refer to similar parts throughout the several views.

The vessel, jar or can 10 with the screw-top 11 with spout 12 attached, forms an air-tight receptacle except for opening at lower end of spout. Liquid feed is put in vessel which descends through screw-top 11 and flows through spout 12 into mortise 13.

Block 14 is fastened to end 15 of hive to better enable fastening of vessel with screw-top and spout attached to hive. The liquid feed will flow into mortise 13 to height of top of lower end of spout 12 and no higher. Surface of feed will remain at that level. The feed will flow into mortise 13 as fast and no faster than consumed by bees. As surface of liquid feed falls below top of lower end of spout 12, air will enter vessel through spout 12 and same quantity of liquid feed will descend into mortise 13. The spiral spring 16 is used to keep vessel 10 firmly in position by means of staples 17.

Having thus fully described this invention, what I desire to claim and protect by Letters Patent, is:

1. The combination of a hive having a mortise formed on the inner side of the wall thereof and an opening through the wall adjacent the mortise, with an inverted air-tight receptacle having a lateral spout extending through the opening and into the mortise substantially as described.

2. The combination of a hive having an opening through one of its walls and an inverted air-tight receptacle having a lateral spout entering the opening, with supporting means comprising a wire encircling the receptacle and secured to the hive, substantially as described.

GEORGE L. WHITE.

Witnesses:
FRANK J. KLINKER,
SAML. D. LUCKENBACH.

---

Copies of this patent may be obtained for five cents each, by addressing the "Commissioner of Patents, Washington, D. C."